Figure 1:
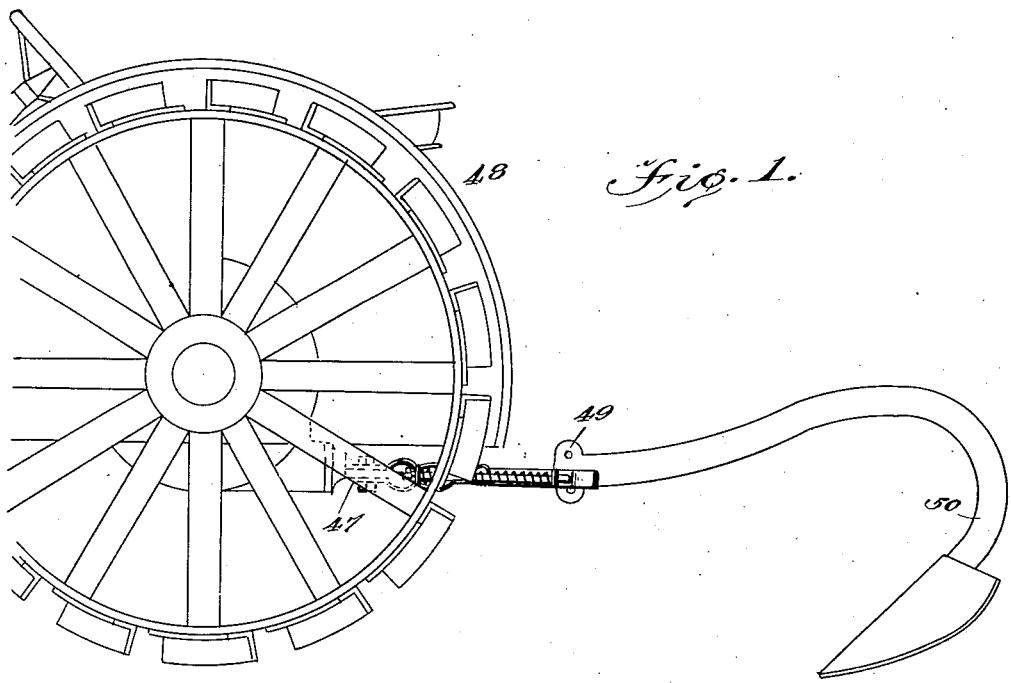

Nov. 9, 1926.

O. B. SKONNORD 1,606,728

TRACTOR HITCH

Filed Oct. 18, 1924    2 Sheets-Sheet 1

INVENTOR
O.B. Skonnord,

Nov. 9, 1926.

O. B. SKONNORD

TRACTOR HITCH

Filed Oct. 18, 1924

1,606,728

2 Sheets-Sheet 2

WITNESSES

INVENTOR
O. B. Skonnord,
BY
ATTORNEYS

Patented Nov. 9, 1926.

1,606,728

UNITED STATES PATENT OFFICE.

OLAF B. SKONNORD, OF VALLEY CITY, NORTH DAKOTA.

TRACTOR HITCH.

Application filed October 18, 1924. Serial No. 744,480.

This invention relates to tractor hitches of the general type shown and described in U. S. Patent #1,423,164 and is an improvement over the construction illustrated therein.

An object of my invention is to provide a tractor hitch which will be actuated automatically to release the load when an undue stress is placed upon the hitch and which moreover will be automatically set to again engage a load without any manual manipulation or adjustment of any of the parts thereof being required.

A further object of the invention is to provide a tractor hitch of the character described which is adapted for engagement with coupling connections of various ordinary types of construction, and which therefore is adapted for use with various agricultural implements without any change in the construction of the latter being necessary.

A further object of the invention is to provide a tractor hitch of the character described which is adapted for use with tractors of various known types of construction.

A still further object of the invention is to provide a tractor hitch of the character described which can be readily converted from a flexible automatically releasing hitch into a non-flexible non-releasing hitch without in any way affecting the automatic coupling action of the device.

More specific objects of the invention are to provide a relatively strong and durable hitch which affords facilities for attaining the aforesaid objects, and to provide a hitch which embodies a novel means for movably supporting a transverse draw bar and for cushioning the movements of the draw bar so that motion will be transmitted through resilient means from an associated draft vehicle to an implement which is connected to the draft vehicle by the hitch both when the draft vehicle moves forward and backwardly, certain of the cushioning elements being adapted to receive and dissipate jars and shocks when the draft vehicle moves backwardly without transmitting such jars and shocks to the rigid members of the device.

With these and other objects in view, as will appear as the description proceeds, the invention consists of the novel features of construction, combinations of elements, and arrangements of parts hereinafter to be fully described and claimed.

A full and complete understanding of the invention may be obtained from a consideration of the following detailed description, taken in connection with the accompanying drawing forming a part of this specification, it being understood that while the draw shows a practical form of the invention, the latter is not to be confined to strict conformity with the showing thereof, but may be changed or modified, so long as such changes and modifications mark no material departure from the salient features of the invention, as specifically pointed out and claimed.

Figure 2:
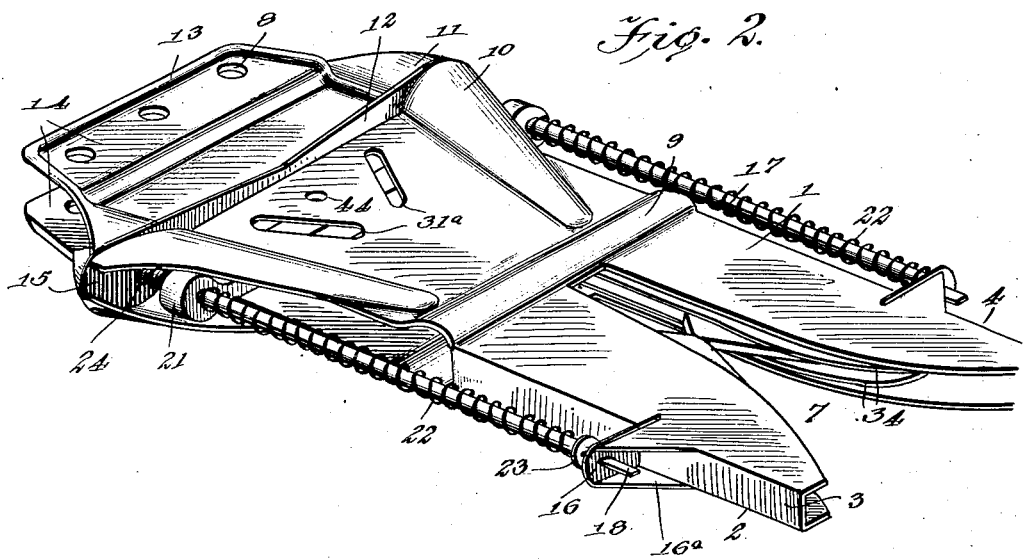
Figure 3:
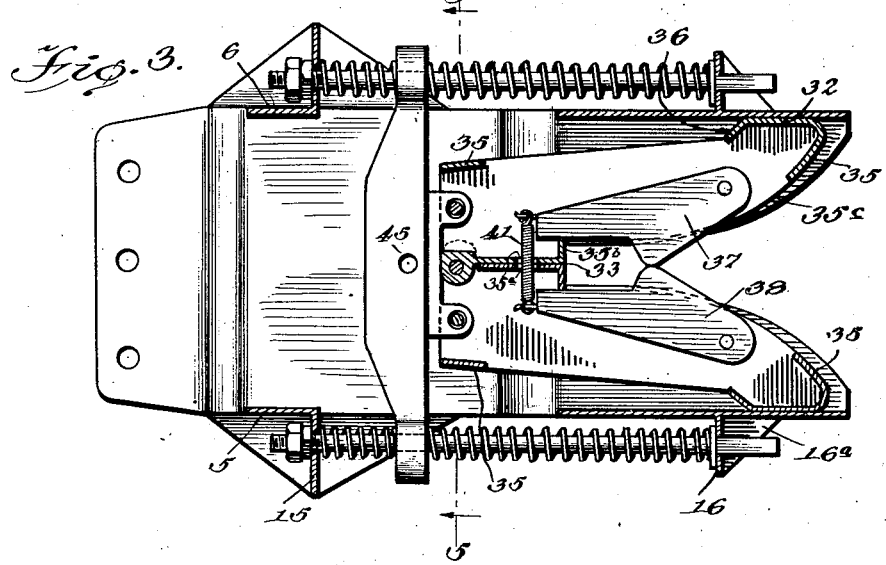
Figure 4:
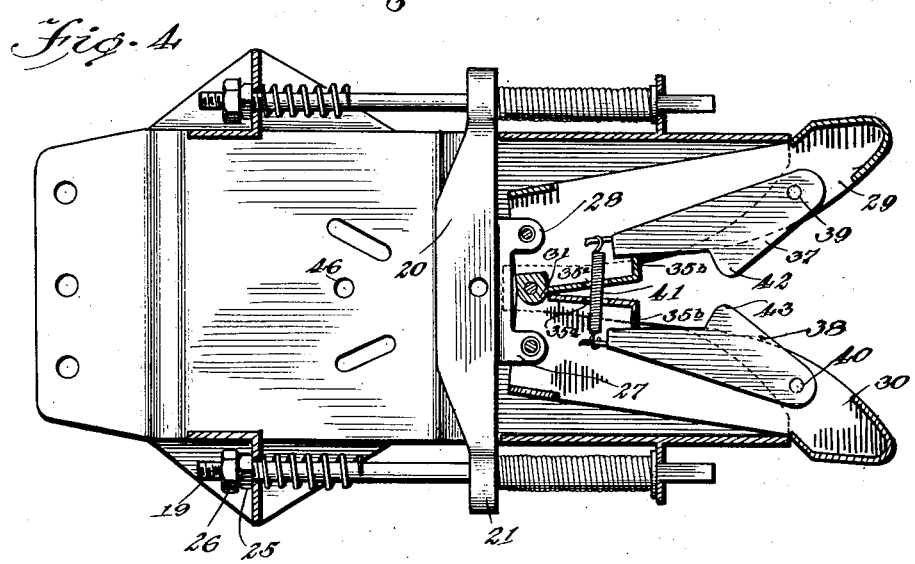
Figure 5:
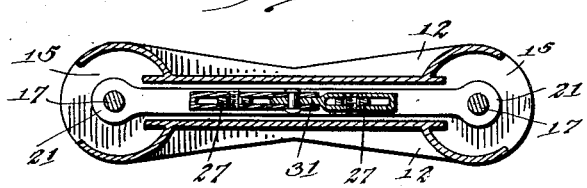

In the accompanying drawing wherein like numerals of reference designate like parts throughout the several views, Figure 1 is a side elevation showing the improved tractor hitch operatively applied, Figure 2 is an enlarged perspective view of the hitch, Figure 3 is a longitudinal horizontal sectional view through the hitch, showing the movable parts thereof in one position, Figure 4 is a view similar to Figure 3, showing the movable parts in a different position, and Figure 5 is a transverse sectional view taken on the line 5—5 of Figure 3.

In carrying out my invention, I provide a casing having substantially parallel horizontally disposed upper and lower walls 1 and 2, respectively, such walls being connected along their side edges throughout a portion of their length by side walls 3 and 4 and by the vertical bracing wall sections 5 and 6. The upper and lower walls 1 and 2 of the casing are cut away at the forward end of the casing, as best shown in Figure 2 of the drawing, to define a substantially V-shaped slot 7 which gradually diminishes in width to a point in line with the rear ends of the side walls 3 and 4 for a purpose hereinafter to be described.

The upper and lower walls which are spaced by the wall sections 5 and 6 are extended rearwardly from the V-shaped slot 7 and are provided with transverse series of vertically alined apertures 8 for receiving bolts or the like for attaching the hitch to a tractor or other draft device. The entire casing is preferably made of one piece of metal and is suitably reinforced by the transverse corrugations 9, diagonally extending arched reinforcing webs 10 and 11, the transverse webs 12 and by the rolled edges 13 on the offset end portions 14.

The vertical plates 15 extend laterally from the sides at the inner ends of the wall sections 5 and 6 and are rigidly supported by the meeting webs 10 and 11 which are integral therewith. Similar though smaller plates 16 extend laterally from the front portion of the casing and are supported by triangular integral braces 16ᵃ extending back to the sides 3 and 4. These plates 15 and 16 serve to support the guide rods 17 in spaced parallel relation to the sides of the casing with their forward flattened ends 18 traversing the rectangular openings in plates 16 and the rear threaded ends 19 traversing the plates 15.

The draw bar 20 is mounted to reciprocate within the casing between the rear of the sides 3 and 4 and the front of the wall sections 5 and 6, and has its opposite ends 21 rounded and apertured to receive the guide rods 17. Spiral expansion springs 22 are mounted on the guide rods 17 and have their opposite ends in engagement with the draw bar 20 and the stop plates 23 on the rods. Other shorter expansion springs 24 are mounted on the rods at the rear of the bar 20 and have their ends in engagement with the plates 15 and the bar 20 respectively. The effective length of the rods and consequently the strength of the springs is adjustable by manipulation of nuts 25 which may be locked in position by the lock nuts 26.

The integral plate 27 extending forwardly from the center of the bar 20 has a pair of spaced apertured forwardly extending lugs or ears 28 upon which are pivotally mounted the complementary plate carrying elements or latch carrying jaws 29 and 30 which are also pivotally connected at their adjacent sides to each other as at 31, slots 31ᵃ being provided through which bolts or the like, providing the pivotal connection between the ears and plates, may be inserted or removed. The pivotal connections between the jaws 29 and 30 and the ears 28 are sufficiently loose, as shown in Figure 4, to permit relative swinging movements of the jaws 29 and 30 between the positions respectively shown in Figures 3 and 4.

These elements are adapted to fit within the casing with the remote walls at the front end thereof in sliding contact with the inner faces of the side walls 3 and 4, as at 32, and with the proximate side walls fashioned to abut one another along a straight line, as at 33, for part of the length of the elements. Each of the elements comprises a pair of spaced plates 34 connected together at the front end and at each side at the back end by side wall sections or upright spacing plates 35 integral with the plates 34. Those plates 35 which space the plates 34 at their abutting edges are provided with alined openings 35ᵃ and at their front ends with laterally outwardly extending wings 35ᵇ for a purpose to be described. The proximate walls of the elements 29 and 30 are offset as at 35ᶜ and diverge so as to be substantially coincident with the edges of the V-shaped slot 7 when the draw bar 20 is in its normal position, as shown in Figure 3 of the drawing, and the remote walls are curved inwardly as at 36 whereby the forward portions of the elements may move apart to the position shown in Figure 4 of the drawing.

Latching plates 37 and 38 respectively are pivoted at their forward ends as at 39 and 40 respectively to work between the spaced plates 34 of the elements 29 and 30. The spiral compression spring 41 connecting the inner ends of the latching plates and traversing the openings 35ᵃ tends to maintain the latching plates in such position that the projections 42 and 43 normally protrude into the V-shaped slot 7 and abut each other as shown in Figure 3, the outwardly extending wings 35ᵇ, constituting stops against which the free ends of the plates are forced by spring 41. The spring 41 will act with equal force on the locking plates 37 and 38 and will tend to pull the inner ends of the locking plates toward each other.

If desired, a pin (not shown) may be projected through the registering openings 44, 45 and 46 in the top wall, the draw bar 20, and the bottom wall 2, respectively to prevent such movement of the plate carrying elements 29 and 30 as would permit a releasing of a coupling connection held between such elements by the latching plates 37 and 38.

From the foregoing description of the various parts of the device, the operation thereof will be readily understood. The offset and apertured end portions 14 are provided at the rear end of the hitch for attaching the latter to a draw head 47 of a tractor of well known type of construction, which tractor is denoted generally at 48 in the drawings. The casing will then extend rearwardly of the tractor and a coupling connection 49 of an implement, such as the plow indicated at 50, will be operatively connected with the tractor when the latter is backed, until the coupling connection 49, which may be a clevis, a ring, a coupling pin, or any coupling element such as is commonly employed, is received within the V-slot 7 in the end of the casing. It will be manifest that the coupling connection 49 will contact the projections 42 and 43 of the latching plates 37 and 38 and will move these plates apart in opposition to the force of the spring 41 until the coupling connection 49 is received in the space between the ends of the projections 42 and 43 and the offset portions 35 of the plate carrying elements 29 and 30. The latching plates 37 and 38 will then be permitted to move together in response to the action of the spring 41 and the coupling connection 49 will be held against movement from the V-shaped slot.

A further movement of the tractor will result in a tractive force being imparted through the springs 22, the draw bar 20, the elements 29 and 30, the latch plates 37 and 38, and the coupling connection 49 to the implement 50, whereby the latter will be drawn. When an excessive load is imposed upon the springs 22 as when the implement 50 encounters an obstruction, the springs will be completely compressed, thereby permitting the elements 29 and 30 to move from the position illustrated in Figure 3 to the position illustrated in Figure 4. Since the remote walls of the elements 29 and 30 are curved inwardly intermediately, these elements are permitted to move a part at their forward ends when extended beyond the casing and in consequence, the coupling connection 49 is released.

As soon as the coupling connection is released, the elements 29 and 30 are returned to the position illustrated in Figure 3 by the action of the springs 22 and will then be in position to again engage the coupling connection 49 or a like member, without any manual manipulation or adjustment of the parts being required. The springs 24 receive the impact of the draw bar 20 when the latter is moved into the position in which illustrated in Figure 3 and any shocks or jars incident to the return of the plate carrying elements to retracted position are thus dissipated.

It will be obvious that an implement to be drawn may be closely connected with a tractor through the agency of this improved tractor hitch, and that the connections will be sufficiently flexible and yielding to insure that the pull of the tractor will be communicated to the implement to be drawn in such a manner as to produce satisfactory results in the service for which intended.

I claim:—

1. A device of the class described, comprising a casing having its upper and lower walls at one end spaced and apertured for connection with a traction device and slotted at its other end, laterally extending plates adjacent the front and rear at each side of the casing, guide rods supported by said plates in spaced parallel relation with the respective sides of the casing, a transverse draw bar slidably mounted on the rods and traversing the casing for limited reciprocation therein, means operatively supported by the draw bar and movable therewith to enclose and hold a portion of a coupling element within said slot when the draw bar is in its retracted position but so arranged as to free said coupling element when the bar is in advanced position, spring means mounted on the rods between the bar and the plates at the slotted end of the casing for yieldingly opposing movement of the bar toward its advanced position, and other spring means on the rods for cushioning the return of said bar to retracted position.

2. A device of the character described comprising an elongated casing having substantially parallel top and bottom walls and having a pair of substantially vertical side walls extending longitudinally of the casing, the top and bottom walls of said casing being cut away intermediate the width of the casing at one end of the casing to produce a substantially V-shaped slot, the side walls of the casing having opposite cut away portions extending longitudinally thereof intermediate the length of the casing, said casing being adapted at its second end for connection with the draw head of a tractor, a draw bar extending transversely of the casing and having end portions extending through the cut away portions of the sides of the casing, said draw bar being mounted to slide longitudinally of the casing for the length of the cut away portions of the side walls of the casing, guide means at opposite sides of the casing in engagement with the end portions of said draw bar for holding said draw bar at right angles to the direction of length of said casing at all times during the reciprocation of said draw bar in said casing, spring means engaged with the end portions of said draw bar and tending to oppose movement of said draw bar in said casing toward the slotted end of the casing, other spring means also engaged with the end portions of said draw bar and tending to prevent movement of said draw bar in the casing toward the opposite end of the casing, and means extending from the middle portion of said draw bar into said substantially V-shaped slot for releasably connecting said draw bar with the coupling element of an agricultural implement or the like.

OLAF B. SKONNORD.